United States Patent [19]
Bailey

[11] 3,918,261
[45] Nov. 11, 1975

[54] WAVE AND TIDE MOTOR

[76] Inventor: Vernon Bailey, 2424 Peach Orchard Road, Augusta, Ga. 30906

[22] Filed: Apr. 10, 1974

[21] Appl. No.: 459,494

[52] U.S. Cl. ............................................. 60/506
[51] Int. Cl.² ........................................ F03G 7/00
[58] Field of Search .................. 290/42, 43, 53, 54; 417/332; 60/506, 497

[56] References Cited
UNITED STATES PATENTS

| | | | |
|---|---|---|---|
| 969,903 | 9/1910 | Raht | 417/332 |
| 1,025,395 | 5/1912 | Hamilton | 60/506 |
| 1,816,044 | 7/1931 | Gallagher | 60/506 |
| 1,823,190 | 9/1931 | Christie | 60/506 |

Primary Examiner—Allen M. Ostrager
Attorney, Agent, or Firm—Sughrue, Rothwell, Mion, Zinn & Macpeak

[57] ABSTRACT

An operating lever having a float secured to one end thereof is pivoted intermediate its ends for oscillating movement in a vertical plane. An elongated channel shaped member having a rack secured thereto is guided for vertical movement along its length and is connected to the other end of the operating lever by a lost-motion connection. A pinion is mounted in meshing engagement with the rack and can be operatively connected to any suitable power generating means.

1 Claim, 3 Drawing Figures

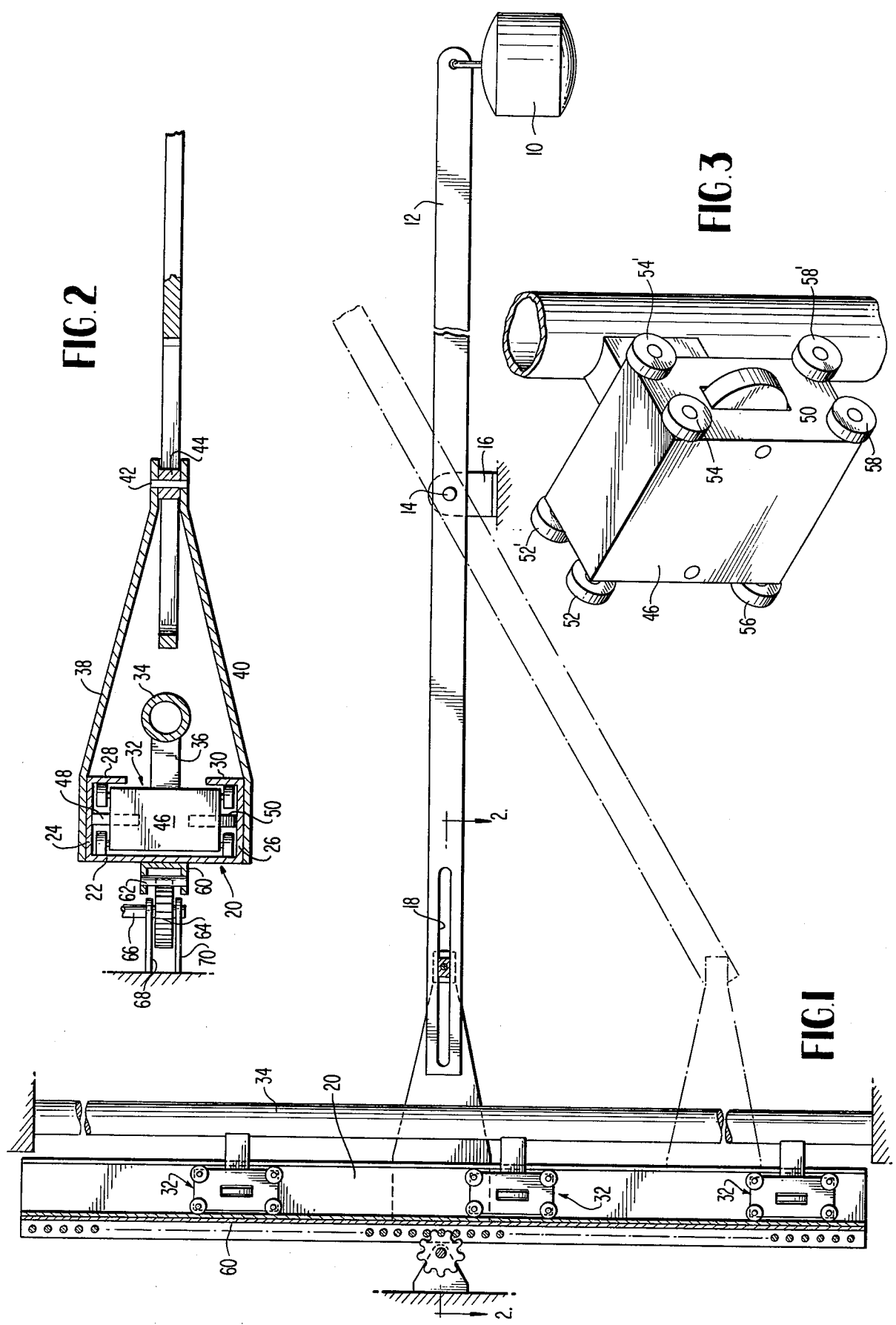

WAVE AND TIDE MOTOR

BACKGROUND OF THE INVENTION

1. Field of the Invention

The present invention is directed to a wave and tide motor and more specifically to a mechanical mechanism for converting the oscillatory motion of a lever having a float on one end to the alternating rotory motion of a power shaft.

2. Prior Art

A large number of prior art tide and wave motors have utilized the bobbing motion of a float to provide the drive for a power plant. In these prior art devices, however, the float was always guided for vertical reciprocatory motion by stationary guide rails or the like. Such an arrangement frequently led to the binding or jamming of the float between the guide rails due to the strong lateral forces exerted on the float by the waves.

Another type of prior art power generator utilized an inclined rack which was connected to a float which in turn was positively guided by guide rails having the same inclination. The float was provided with a scoop-like mechanism on the side facing the on-coming waves so that the force of the waves would drive the float and rack upwardly at an angle to drive a pinion in mesh with the rack. Once again the confinement of the wave response member for movement along the fixed track often led to undesirable binding due to the variations in force and direction of the waves.

Still another form of wave motor utilizes a trough for channeling the incoming waves. A plurality of paddle-like members secured to a pair of endless chains extend into the trough so that the force of the incoming water will move the paddles and rotate a sprocket shaft over which the endless chains are entrained. Such an arrangement is extremely inefficient since the trough will only be located at a single fixed position so that at low tide little or no water might move up the trough whereas at high tide or during a storm the entire paddle mechanism would be swamped.

SUMMARY OF THE INVENTION

The present invention provides a wave and tide motor which is extremely responsive to all wave conditions both at high tide and low tide.

The present invention provides a wave and tide motor which has a high mechanical efficiency and float arrangement which will prevent undesirable binding of the mechanism.

The present invention provides a wave and tide motor having a float connected to one end of a lever pivoted intermediate the ends thereof. The opposite end of the lever is connected by means of a lost-motion connection to a rack carried by an elongated channel member which is guided for vertical reciprocatory movement with the rack disposed in meshing engagement with a pinion secured to a suitable power output shaft.

The foregoing and other objects, features and advantages of the invention will be apparent from the following more particular description of the preferred embodiment of the invention as illustrated in the accompanying drawings.

DETAILED DESCRIPTION OF THE DRAWING

FIG. 1 is a side elevation view, partly in section, of the wave and tide motor of the present invention.

FIG. 2 is a view taken along the line 2—2 of FIG. 1

FIG. 3 is a perspective view of a guide bearing upo which a channel shaped member may be guided for re ciprocatory movement.

DETAILED DESCRIPTION OF THE INVENTION

The wave and tide motor in the present invention i comprised of a float 10 secured to one end of the leve 12 which is pivoted intermediate the ends thereof at 1 on any suitable support 16. The opposite end of th lever is provided with an elongated slot 18 to provide sliding lost-motion connection with an elongated char nel shaped member 20.

The channel member 20 is provided with a front wa 22 and side walls 24 and 26 each of which has a shor flange 28 and 30 extending toward each other parall to the front wall 22. An access opening is defined be tween the flanges 28 and 30 to provide for the connec tion of internal bearing members 32 to a fixed verticall extending stanchion or post 34 by means of suppor arms 36. A pair of rearwardly extending connectin plates 38 and 40 are secured to the opposite sides 2 and 26 of the channel member 20. The plates 38 and 4 are then bent toward each other and are connected t each other by means of a pin, rivet, bolt or the like 4; A bearing block 44 is mounted on the pin 42 betwee the two pplates and is guided for movement within th slot 18 in the end of the lever 12 to provide a suitabl lost-motion connection between the lever 12 and th channel member 20.

Depending upon the length of the channel membe 20 two or more bearing members 32 may be dispose within the channel for guiding the same for vertical re ciprocatory movement. Although three of these bea ing members are shown in FIG. 1 it is obvious that th number and spacing of the bearing members could vai depending upon the circumstances. Each bearing men ber is comprised of a main block 46 having a plurali of roller means journaled thereon for engagement wit the internal surfaces of the channel member 20. A pa of rollers 48 and 50 are rotatably mounted in the bloc 46 for rolling engagement with the sides 24 and 26 re spectively of the channel member 20. Four rollers 5 54, 46 and 58 are rotatably mounted on the block 4 for rolling engagement with the internal surfaces of th front wall 22 of the channel shaped member 20. For additional rollers 52', 54', 56' and 58' are mounted fc rotation in the block 46 for rolling engagement with th internal surfaces of the flanges 28 and 30. The roll 56' is not visible in the drawing but would be mounte at the lower corner of the block 46 directly beneath th roller 52, and in the same horizontal plane as the rolle 56, 58 and 58'. By means of these multiple rollers four sides of the channel member 20 are guided by ro ing means to prevent binding of the channel memb 20 as it reciprocates in the vertical direction. Each the rollers may be mounted on their respective stu shafts by means of suitable anti-friction bearings whic have not been specifically shown in the drawings. Th utilization of two or more of these bearing guide mer bers 32 also insures perfect vertical reciprocato movement without danger of binding or bending.

A rack member 60 is mounted on the front face 22 the channel member 20 and is comprised of a U-shape member having a plurality of equally spaced apart pz allel pins 62 extending between the sides of the l shaped member. A pinion 64 is disposed in meshing e gagement with the pins 62 and is connected to a pow output shaft 66 which may be connected to a suitable mechanism such as an electric power generator. The shaft 66 may be journaled in pair of support flanges 68 and 70 which may be secured to any suitable base member.

The post 34 and the rack and pinion mechanism 60, 64 may be enclosed within a housing of suitable design which is provided with an aperture for the movement of the lever 12. In this way, the entire mechanism with the exception of the float and lever can be substantially isolated from the force of the waves to prevent damage thereto. The support for the pinion 64, the pivot pin 14 and the post 34 could be a part of the housing or any other suitable support which would provide the desired stability. By varying the length of the lever arms on opposite sides of pivot pin 14 the mechanical advantage of the wave and tide motor can be varied.

In operation the float 10 will be responsive to any water movement whether it be the result of waves or tides and it is immaterial if the float 10 is completely immersed or not since it will still be responsive to the movement of the water. As the float moves up as shown in FIG. 1 the lever will move from the solid line position to the dot-dash line position thereby forcing the plates 38 and 40 and the channel member 20 to which they are connected downwardly. The plate 40 will therefore move from a solid line position to the dot-dash line position and the bearing block 44 will move to the end of the slot 18 closest to the end of lever 12. The channel member 20 has not been shown in the translated position due to space requirements in the drawings but it will also move downwardly a distance commensurate with the movement of plates 38 and 40. This movement of the channel member 20 will move the rack 60 downwardly thereby rotating the pinion 64 and the power of output shaft 66 which is connected to provide a source of power. As the float moves downwardly these parts will move in the opposite direction including the output shaft 66. Suitable well known mechanical or electric conversion means can be connected to the power output shaft 66 to effectively utilize the rotation of the shaft in opposite direction.

The various parts of the wave and tide motor in accordance with present invention may be made of any suitable materials. If the motor is being utilized in a salt water environment it would of course be necessary to utilize corrosive resistent materials such as plastic or the like where feasible. While the invention is being particularly shown and described with reference to the preferred embodiment thereof it will be understood by those in the art that various changes in form and details may be made therein without departing from the spirit and scope of the invention.

I claim:

1. A wave and tide motor comprising support means, a lever pivoted intermediate the ends thereof on said support means, float means connected to one end of said lever, rack means, guide means for guiding said rack means for vertical reciprocatory movement, lost-motion connecting means connecting said rack means to the other end of said lever, pinion means operatively engaged with said rack means and power output shaft means connected to said pinion means, said rack means being comprised of an elongated hollow rectilinear C-shaped channel member having a rack on one exterior surface thereof and said guide means being comprised of a fixed post having a plurality of spaced apart guide blocks thereon disposed within said hollow channel member and a plurality of roller elements journalled in said guide block for a rolling engagement with each of the interior surfaces of said hollow channel member.

* * * * *